No. 879,420. PATENTED FEB. 18, 1908.
W. SHAKESPEARE, Jr.
SPOOL FOR FISHING REELS.
APPLICATION FILED MAY 25, 1905.
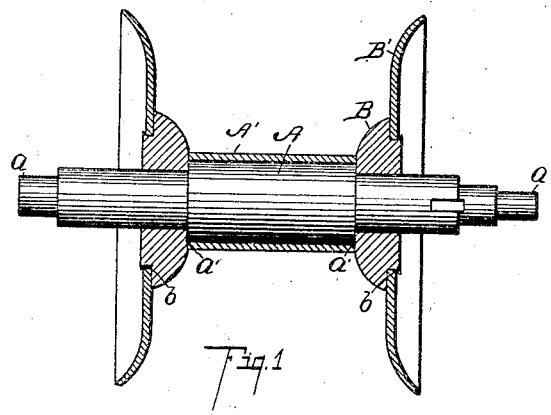
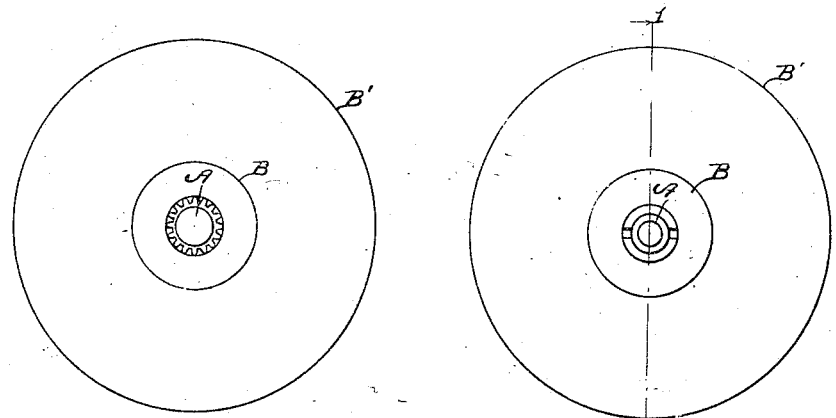
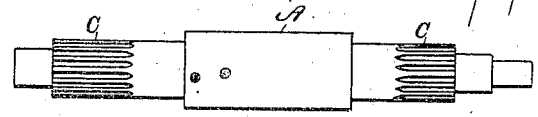
Witnesses:
Inventor,
William Shakespeare Jr
By Chappell Earl
Att'ys

UNITED STATES PATENT OFFICE.

WILLIAM SHAKESPEARE, JR., OF KALAMAZOO, MICHIGAN.

SPOOL FOR FISHING-REELS.

No. 879,420.         Specification of Letters Patent.         Patented Feb. 18, 1908.

Application filed May 25, 1905. Serial No. 262,216.

*To all whom it may concern:*

Be it known that I, WILLIAM SHAKESPEARE, Jr., a citizen of the United States, residing at the city and county of Kalamazoo, State of Michigan, have invented certain new and useful Improvements in Spools for Fishing-Reels, of which the following is a specification.

This invention relates to improvements in spools for fishing reels.

The objects of this invention are—first, to provide an improved spool for fishing reels which may be produced at a minimum expenditure of labor and material. Second, to provide an improved spool for fishing reels which is attractive in appearance, and, at the same time is very strong and durable.

Further objects, and objects relating to the structural details will definitely appear from the detailed description to follow.

I accomplish the objects of my invention by the devices and means described in the following specification, in which—

Figure 1 is a longitudinal sectional view of my improved spool for fishing reels, the shaft portion A thereof being shown in full lines. Fig. 2 is an end elevation view looking from the right of Fig. 1. Fig. 3 is a plan view of a modified construction, the pinions C being formed integral with the shaft. Fig. 4 is an end elevation view corresponding to that of Fig. 2, showing the shaft with the journals formed integral therewith.

In the drawing, similar letters of reference refer to similar parts throughout the several views.

Referring to the drawing, the shaft A of the spool is provided with journals $a$ at each end. The shaft with its journals is turned up from a single piece of metal. The center of the shaft is incased in a brass, or other suitable non-corrosive, tubular casing A′.

The shaft A is shouldered at each end as $a'$ to receive the hub portions B of the flanges. These hubs are crowded upon the shaft against the shoulders. In practice, I find it unnecessary to provide any further fastening therefor. However, if desired, solder might be used to aid in securing them.

The hubs B are shouldered on their outer sides at $b$ to receive the flanges B′. The flanges are retained on the hubs by slightly upsetting the hub thereon which forms the same into a practically solid construction. This upsetting is illustrated in an exaggerated degree in the drawing, only a very slight amount being required in practice. The flanges B′ are struck up from flat sheets of metal to secure the desired flaring thereof. After the flanges are put in place, suitable pinions are secured upon the shaft, or, if desired, they may be cut therein as is illustrated in Figs. 3 and 4.

By thus forming and assembling the parts, I secure a spool which is formed with a minimum of material and of labor both in the manufacture of the parts and in assembling. The steel shaft portion is protected by a sleeve A′ of non-corrosive metal so that it does not corrode from the moisture of the wet line.

After the structure is assembled, it is preferably nickeled and polished so that it has the appearance of being a solid structure; that is, it has the appearance of being cut from a solid piece of metal.

The parts of the spool are secured together so that there is no danger of their becoming loosened with use and they are so strongly secured together that there is no liability of the spool becoming bent or twisted, although the reel be subjected to very severe usage.

I have illustrated and described my improved reel in the form preferred by me on account of its structural economy, though I am aware that it is capable of considerable structural variation without departing from my invention.

Having thus described my invention, what I claim as new and desire to secure by Letters Patent, is:

1. In a spool for fishing reels, the combination of a shaft of steel or other suitable material, shouldered to form a central enlargement, and having journals on each end thereof; a tubular casing of non-corrosive metal embracing said central enlargement; flange hubs crowded onto said shaft against the said shoulders thereof; and flanges arranged upon said hubs, for the purpose specified.

2. In a spool for fishing reels, the combination of a shaft, shouldered to form a central enlargement and having journals at each end thereof; flange hubs crowded onto said shaft against the said shoulders thereof; and spool flanges arranged upon said hubs, for the purpose specified.

3. In a spool for fishing reels, the combination of a shaft of steel or other suitable material, having journals on each end thereof; a tubular casing of non-corrosive metal embracing the central portion of said shaft; flange hubs having shoulders formed on their outer sides, crowded onto said shaft against the ends of said tubular casing; and flanges arranged upon the shoulder portions of said hubs and secured thereon by upsetting the same, for the purpose specified.

4. In a spool for fishing reels, the combination of a shaft of steel or other suitable material, having journals on each end thereof; a tubular casing of non-corrosive metal embracing the central portion of said shaft; flange hubs crowded onto said shaft against the ends of said tubular casing; and flanges arranged upon said hubs, for the purpose specified.

5. In a spool for fishing reels, the combination of a shaft of steel or other suitable material having journals formed thereon; a tubular casing of non-corrosive material embracing the central portion thereof; and suitable flanges, for the purpose specified.

6. In a spool for fishing reels, the combination of a shaft of steel or other suitable material; a tubular casing of non-corrosive metal embracing the central portions thereof; and suitable flanges, for the purpose specified.

In witness thereof I have hereunto set my hand and seal in the presence of two witnesses.

WILLIAM SHAKESPEARE, JR. [L. S.]

Witnesses:
ADELAIDE T. ADAMS,
OTIS A. EARL.